US 6,578,255 B2

(12) United States Patent
Lawrence et al.

(10) Patent No.: US 6,578,255 B2
(45) Date of Patent: Jun. 17, 2003

(54) APPARATUS FOR LAMINATING SEGMENTED CORE FOR ELECTRIC MACHINE

(75) Inventors: Robert Anthony Lawrence, Kokomo, IN (US); Gerald R Stabel, Swartz Creek, MI (US)

(73) Assignee: Delphi Technologies, Inc., Troy, MI (US)

( * ) Notice: Subject to any disclaimer, the term of this patent is extended or adjusted under 35 U.S.C. 154(b) by 5 days.

(21) Appl. No.: 09/854,884

(22) Filed: May 14, 2001

(65) Prior Publication Data

US 2002/0163276 A1 Nov. 7, 2002

Related U.S. Application Data

(60) Provisional application No. 60/288,289, filed on May 2, 2001.

(51) Int. Cl.$^7$ .......................... H01F 3/04; H02K 15/00; H02K 1/00; B23R 19/00
(52) U.S. Cl. .......................... 29/609; 29/596; 29/732; 310/216
(58) Field of Search .......................... 29/596, 732, 606, 29/33 R, 33.2, 243.526, 243.528, 243.522, 243.523, 609; 310/216, 42, 43, 44, 45

(56) References Cited

U.S. PATENT DOCUMENTS

| 4,216,892 A | * | 8/1980 | Asai et al. ................. 228/44.3 |
| 4,455,743 A | * | 6/1984 | Witwer et al. ................. 29/596 |
| 5,592,731 A | * | 1/1997 | Huang et al. ................. 29/596 |

FOREIGN PATENT DOCUMENTS

| JP | 07-015923 | * | 1/1995 | .......... H02K/15/02 |
| JP | 07-143706 | * | 6/1995 | .......... H02K/15/02 |

* cited by examiner

Primary Examiner—Carl J. Arbes
Assistant Examiner—Tim D Phan
(74) Attorney, Agent, or Firm—Margaret A. Dobrowitsky

(57) ABSTRACT

A segmented core for an electric machine includes segments stamped from coated electric steel. The segments each have a first end, a second end, and winding openings. A predetermined number of segments are placed end-to-end to form layers. The layers are stacked such that each of the layers is staggered from adjacent layers by a predetermined rotation angle. The winding openings of each of the layers are in vertical alignment with the winding openings of the adjacent layers. The stack of layers is secured to form the segmented core.

16 Claims, 9 Drawing Sheets

APPARATUS FOR LAMINATING SEGMENTED CORE FOR ELECTRIC MACHINE

CROSS REFERENCE TO RELATED APPLICATIONS

This application claims the benefit of United States Provisional Application 60/288,289, filed May 2, 2001, the contents of which are incorporated herein by reference thereto.

STATEMENT REGARDING FEDERALLY SPONSORED RESEARCH OR DEVELOPMENT

This U.S. Government has a paid-up license in this invention and the right in limited circumstances to require the patent owner to license to others on reasonable terms as provided for by the terms of, Contract No. DE-FC08-00NV13673

TECHNICAL FIELD

This application relates generally to laminated cores for electric machines. More particularly, this application relates to cores formed from a plurality of stacked segments and the methods and apparatus used in the manufacture of such laminated cores.

BACKGROUND

Electric machines include stators and rotors that employ a plurality of stacked layers of electrical steel.

By way of example, an electric machine 10 is provided in FIGS. 1 through 3. Electric machine 10 includes a stator core 12 and a rotor core 14. Cores 12 and 14 are formed of a stack of layers 16. Layers 16 are formed of electrical steel, namely steel having high silicone content. Each layer 16 is coated with an insulating coating 18. An example layer 16 of stator core 12 is illustrated in FIG. 3. Here, layer 16 includes a central bore 20 for receiving rotor core 14 and a plurality of spaced apart notches 22 for receiving motor windings 23.

Several prior methods have been used to manufacture layer 16 and/or cores 12 and 14. For instance, a complete layer 16 has been stamped from a blank sheet of stock. However, this single stamping system provides poor material utilization of the stock material, which leads to higher manufacturing costs.

In another method, cores 12 and 14 have been manufactured using a continuous stamped layer of insulated electrical steel 24 as illustrated in FIG. 4. Continuous stamped layer 24 is wound about an arbor 26 to form cores 12 and 14. Arbor 26 includes blades 28 that receive and align notches 22 of the layer to the arbor. A feed gear (not shown) feeds continuous stamped layer 24 into forming rollers 27. Arbor 26 is geared/timed to the feed gear. Forming rollers 27 are adapted to form a radius corresponding to the radius of arbor 26 in continuous stamped layer 24. Thus, rotation of arbor 26 draws continuous stamped layer 24 (having its notches 22 aligned by blades 28) about the arbor to form cores 12 and 14 as a helically wound core. This helical winding method provides superior material utilization as compared to the single stamping method described above. However, such helical winding methods require large initial investment in the equipment necessary to wind continuous stamped layer 24 about arbor 26.

SUMMARY

A segmented core for an electric machine is provided. The segment core includes segments stamped from coated electric steel. The segments each have a first end, a second end, and winding openings. A predetermined number of segments are placed end-to-end to form layers. The layers are stacked such that each of the layers is staggered from adjacent layers by a predetermined rotation angle. The winding openings of each of the layers are in vertical alignment with the winding openings of the adjacent layers. The stack of layers is secured to form the segmented core.

An apparatus for manufacturing a segmented core for an electric machine is provided. The apparatus includes a stacking head, a dial and a support table. The stacking head has a magazine, a stripper blade and a stripper blade actuator. The magazine is sized, dimensioned and positioned to receive segments stacked one on top of the other. The segments are stamped from coated electric steel. Each segment has an annular length and winding openings. The dial has an arbor and means for rotating the dial. The arbor has an outer diameter approximately equal to an inner diameter of the segmented core. The arbor also has radially extending blades being sized, positioned and dimensioned to engage the winding openings. The support table supports the stacking head and the dial. The support table also includes rollers disposed about the arbor at an outer diameter of the segmented core. A controller controls the stripper blade actuator and the rotating means. The controller forms layers from the segments by rotating the dial the first predetermined angular distance, extending the stripper blade, and retracting the stripper blade until one of the layers is complete. The controller staggers the layers by rotating the dial the second predetermined angular distance between each completed layer.

A method of making a segmented core for an electric machine is provided. The method includes stamping lamination segments, forming layers from the lamination segments, stacking the layers in a staggered fashion, and securing the stack of layers to form the segmented core. The lamination segments are stamped from a blank of coated electrical steel. Each lamination segment has a first end, a second end, and winding openings. The layers are formed placing a predetermined number of lamination segments end-to-end such that the first end of one of the lamination segments is adjacent the second end of another of the lamination segments. The layers are staggered by rotating adjacent layers by a predetermined rotation angle such that the winding openings of each of the layers are in vertical alignment with the winding openings of the adjacent layers.

The above-described and other features and advantages of the present invention will be appreciated and understood by those skilled in the art from the following detailed description, drawings, and appended claims.

DESCRIPTION OF THE PREFERRED EMBODIMENT

Figure 1:
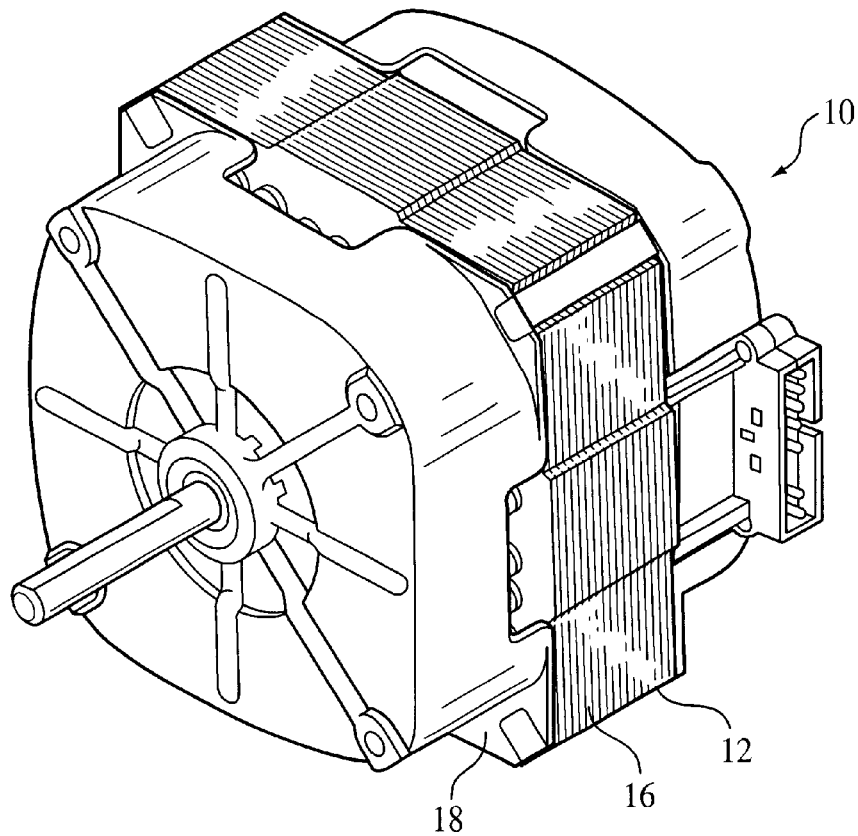
FIG. 1 is a perspective view of an electric machine.
Figure 3:
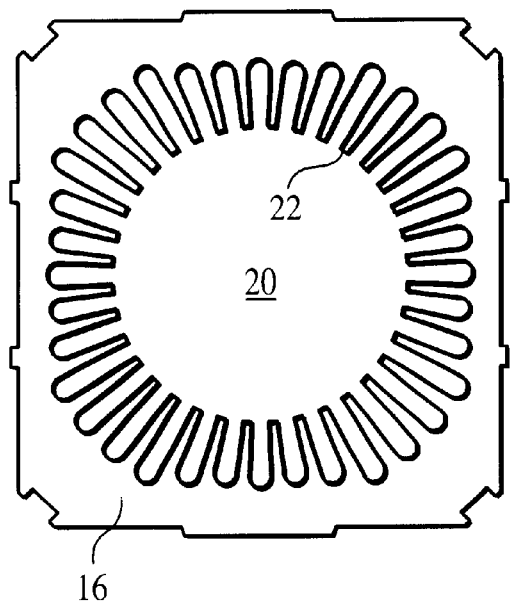
FIG. 3 is a front view of a stator lamination core of the electric machine of FIG. 1.
Figure 2:
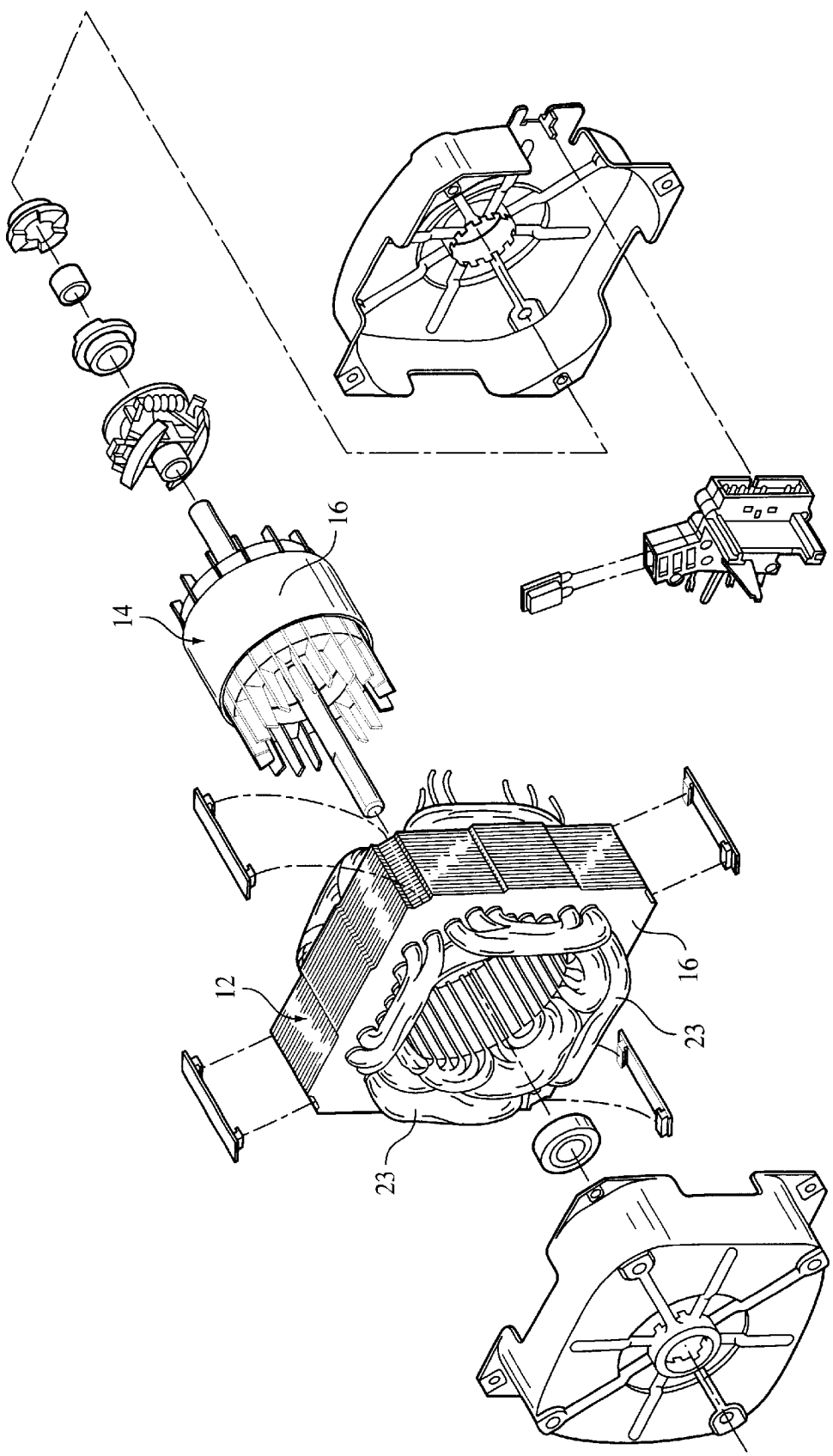
FIG. 2 is an exploded view of the electric machine of FIG. 1.
Figure 4:
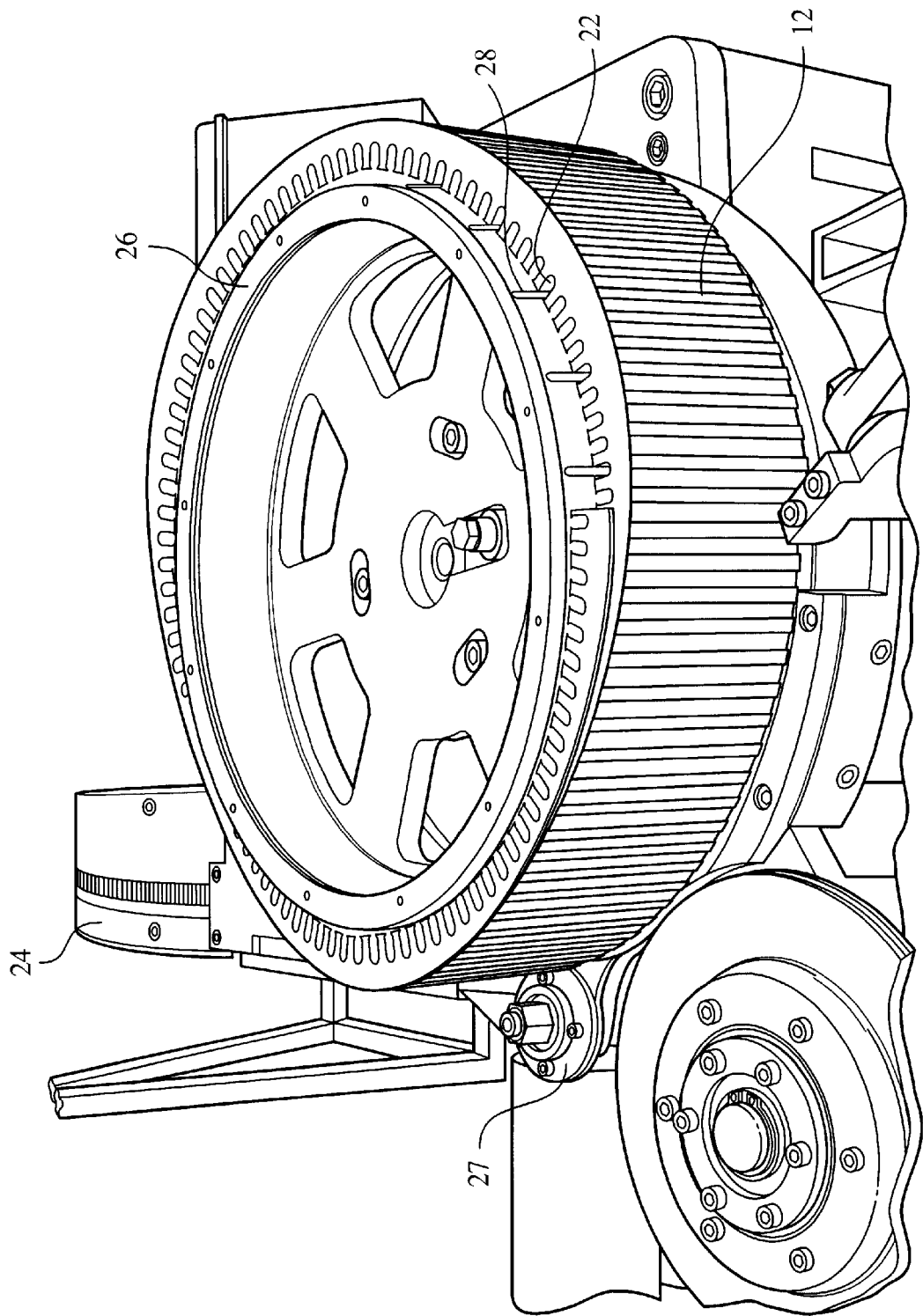
FIG. 4 is a perspective view of a method of manufacturing a core of the electric machine of FIG. 1.
Figure 5:
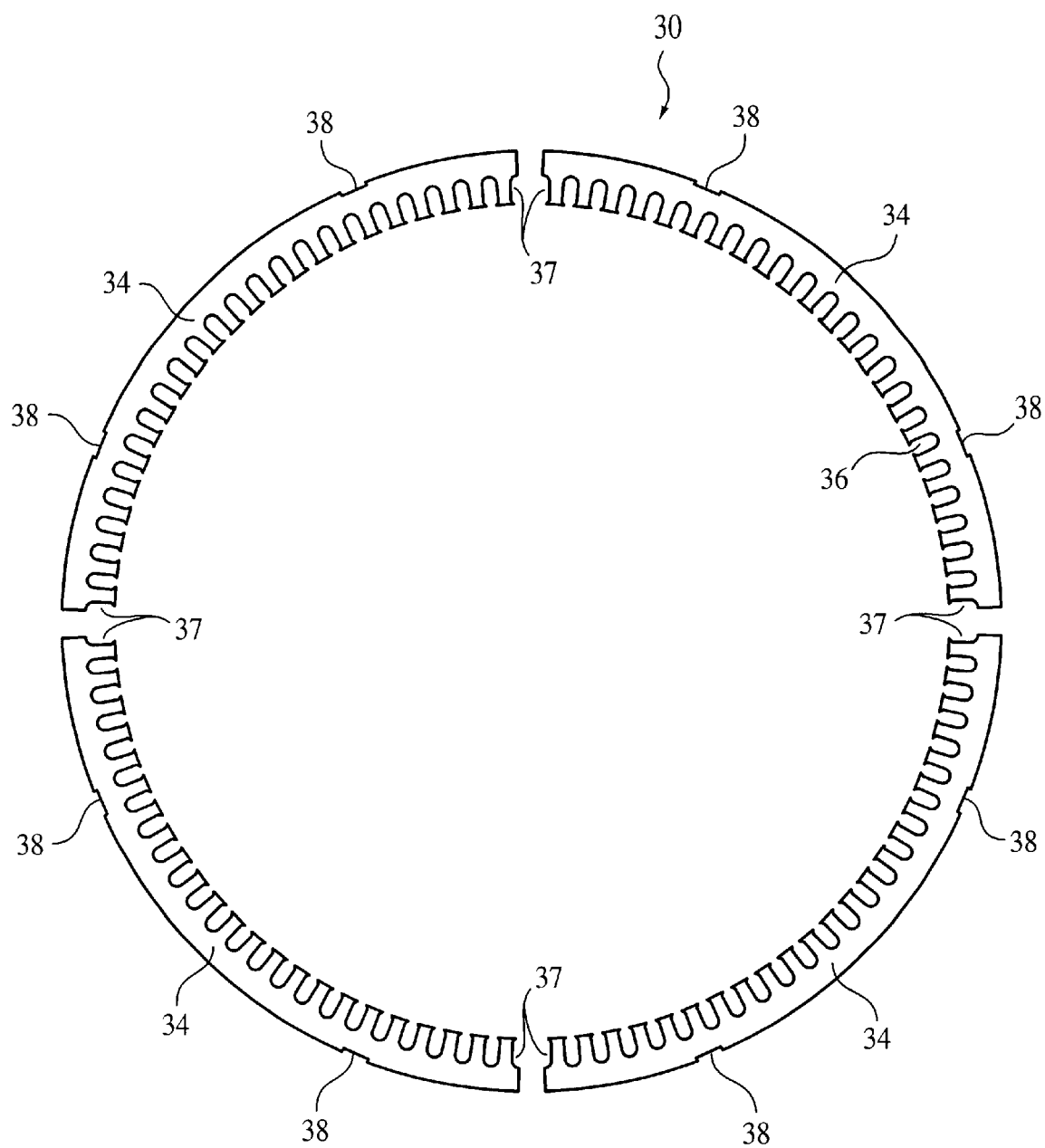
FIG. 5 is a top view of a segmented layer of a core.
Figure 6:
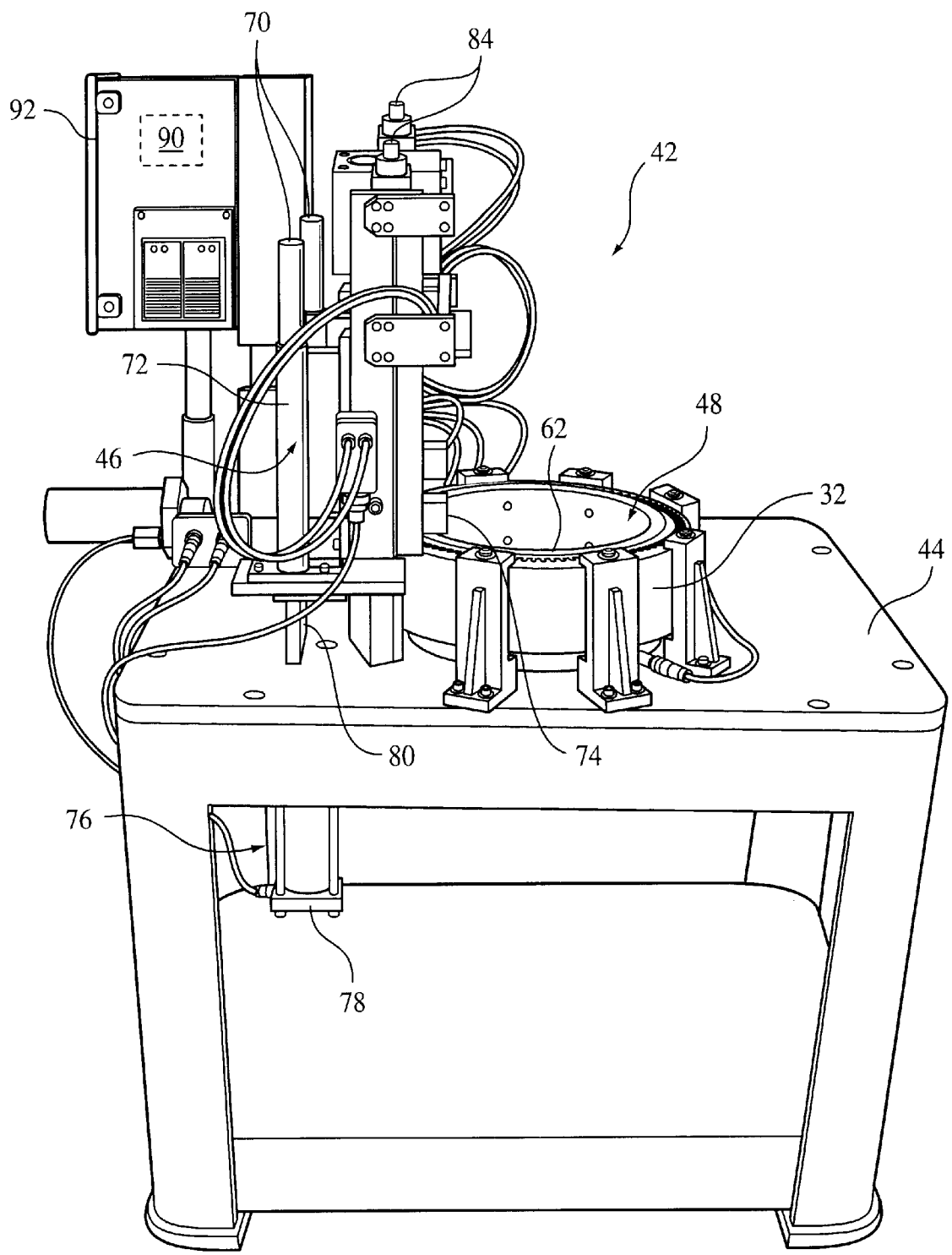
FIG. 6 is a front view of a stacking machine for manufacturing a segmented core.

Referring now to FIG. 5, a layer 30 is illustrated. Layer 30 is used in the manufacture of a rotor or stator core 32 (hereinafter core) of an electric machine. Layer 30 includes four segments 34, thus each segment has an annular length of approximately 90°. Segment 34 is stamped from a sheet of coated electrical steel. Segment 34 includes winding openings 36 and cleat notches 38. Openings 36 are adapted to receive a motor winding, while cleat notches 38 receive a cleat 40 to hold layers 30 together to form core 32 as described below.

In the embodiment of FIG. 5, each segment 34 includes twenty-three openings 36 and a half opening 37 on each end. Segments 34 are placed end-to-end such that two half openings 37 from adjoining segments form one opening 36. Thus, layer 30 formed of four segments 34 has ninety-six openings. Layer 30 is described above as including ninety-six openings 36 by way of example. Layer 30 having other numbers of openings sufficient for the operation of the electric machine are considered within the scope of the present a invention.

For purposes of clarity, segments 34 are described herein as having an annular length of 90° and layer 30 is described as including four of such segments. However, layer 30 including any number of segments 34 that, when placed end-to-end, equal 360° are within the scope of the present invention. For example, layer 30 can include three segments having a 120° annular length, six segments having a 60° annular length, eight segments having a 45° annular length, and so on. Thus, the annular length and corresponding number of segments 34 necessary to equal 360° is selected to maximize the material usage when the segments are stamped from the blank sheet.

Additionally, for purposes of clarity core 32 is described herein as including one hundred and sixty layers 30. Thus, core 32 includes six hundred forty segments 34, divided among one hundred sixty layers 30. However, core 32 including any number of layers 30 and segments 34 are within the scope of the present invention.

Assembly of core 32 is described with reference to a stacking machine 42 illustrated in FIGS. 6 through 9. Stacking machine 42 is a high-speed assembly machine for forming core 32. Generally, stacking machine 42 includes a support table 44, a stacking head 46, and a dial 48.

Stacking head 46 includes a magazine 50, a stripper blade 52, a stripper blade actuator 54 and an anvil 56. Segments 34 are stacked, one on top of the other, in magazine 50 through top 58 of the magazine. Actuator 54 is adapted to extend stripper blade 52 into segment 34 at bottom 60 of magazine 50. Thus, stripper blade 52 strips the bottom segment 34 from the stack of segments in magazine 50 and indexes the segment forward into dial 48. Actuator 54 is further adapted to retract stripper blade 52 from the forwardly indexed segment 34. Illustrated in FIG. 8, stripper blade 52 includes recesses 53. In a preferred embodiment, anvil 56 includes protrusions 55 corresponding to recesses 52. Thus during the extension and retraction of stripper blade 52 with respect to anvil 56, recesses 53 aid in guiding the stripper blade over the anvil by mating with protrusions 55.

Dial 48 includes an arbor 62 at its outer circumference. The outer diameter of arbor 62 is equal to the inner diameter of core 32. Thus, stripper blade 52 strips segment 34 from bottom 60 of magazine 50 into engagement with arbor 62. Arbor 62 includes a plurality of blades 64 that receive and align winding openings 36 of segment 34 to the arbor.

Dial 48 is adapted to be rotated with respect to table 44 in the direction of arrow 66. After segment 34 has been indexed by stripper blade 52 into arbor 62, the dial rotates 90° (i.e., the size of each segment 34) to allow the next segment 34 to be placed onto the arbor. Support table 44 includes rollers 68 disposed about arbor 62 at the outer diameter of core 32. Thus, core 32 is assembled one segment 34 at a time between arbor 62 and rollers 68. Each layer 30 is formed by placing four segments 34 end to end by stripping the segments one at a time from magazine 50 and rotating dial 48 after each segment 90°. Dial 48 rotates by means of, for example, a rotary servo-motor, a rotary pneumatic cylinder, a motor or the like.

It should be recognized that dial 48 is illustrated by way of example as rotating in the clockwise direction of arrow 66. However, it is considered within the scope of the present invention for dial 48 to rotate in a counter-clockwise direction, or combination of clockwise and counterclockwise rotations.

In order to provide core 32 with a high degree of rigidity, layers 30 are staggered with respect to one another. Namely, after each layer 30 is complete, dial 48 is rotated in a transition cycle an angle other than 90° prior to the formation of the next layer. By way of example, the transition cycle rotates dial 48 about 45°. The pattern of forming each layer 30 followed by a transition cycle rotation (i.e., rotating 90°, 90°, 90°, and 45°) is repeated for each layer until core 32 is completed. Thus, core 32 has a staggered pattern of layers 30, similar to the stacking pattern of bricks, which provides core 32 with a high degree of rigidity. It should be recognized that the transition cycle is described by way of example as a 45° rotation between each layer 30. However, it is considered within the scope of the present invention for the transition cycle to provide different angles between each layer 30 (e.g., 15° between some layers, 30° between other layers, and so one) to further increase the staggered pattern between layers and, thus, further increase the rigidity of core 32.

It should be recognized that forming core 32 using the process described above ensures that winding openings 36 in each layer 30 are in vertical alignment with the winding openings in each successive layer. Similarly, forming core 32 using the process described above ensures that cleat notches 38 in each layer 30 are in vertical alignment with the cleat notches in each successive layer. Namely, cleat notches 38 are formed in each segment 34 about 22.5° from the end of the segment, and 45° from one another. Thus, rotation of segments 34 in the 90°, 90°, 90 °, 45° pattern described above ensures that notches 38 are in vertical alignment after core 32 is completed.

Stacking head 46 is slidably mounted on shafts 70 by riser blocks 72. Shafts 70 are connected to table 44 at the lower ends of the shafts. Accordingly, magazine 50, stripper blade 52, stripper blade actuator 54, and anvil 56 of stacking head 46 slide together as an assembly up and down with respect to table 44. Illustrated in FIG. 7, stacking head 46 includes cam rollers 74 positioned and dimensioned on the stack head so as to ride on core 32 as the core is formed from segments 34. Thus each time dial 48 is rotated and a new segment 34 is indexed into arbor 62, stacking head 46 slides upward on shafts 70 as a result of cam rollers 74 acting on core 32. The upward sliding of stacking head 46 ensures that stripper blade 52 is properly positioned with respect to core 34 such that the stripper blade indexes segments 34 in a proper vertical position on arbor 62.

In an alternate exemplary embodiment, stacking head 46 further includes a positioning mechanism 76. Mechanism 76 is connected to stacking head 46 and table 44 and is adapted to compensate for the weight of the stacking head. Mechanism 76 supports the weight stacking head 46. Thus, mechanism 76 reduces the friction between cam rollers 74 and core 32, and requires that the cam rollers acting on the core provide only enough force to slide the stacking head upwards. In a preferred embodiment, mechanism 76 is an air spring including a pneumatic cylinder 78 providing a lifting force to a shaft 80 connected to stacking head 46. It should be recognized that mechanism 76 is described above by way of example as an air spring, and that other mechanisms such as, but not limited to, a ball screw and the like are considered within the scope of the present invention.

The stamping process used to form segments 34 has been known to cause distortion or surface defects to the segment. Upon placement of segments 34 on dial 48, such defects can cause the segments to not rest flush in the dial.

Additionally, forces imparted by cam rollers 74 on segments 34 in dial 48 can cause deflection of segments 34. More specifically, since layers 30 are staggered with respect to one another, each time a segment 34 is indexed into dial 48, the ends of two segments from the previous layer meet or abut in at the midpoint of stripper blade 52. Cam rollers 74 act on these segments 34 in dial 48 proximate the ends opposite those abutting at the midpoint of stripper blade 52. Thus, cam rollers 74 acting segments 34 in dial 48 can cause the ends of these segments in the middle of stripper blade 52 to deflect upwards.

Figure 7:
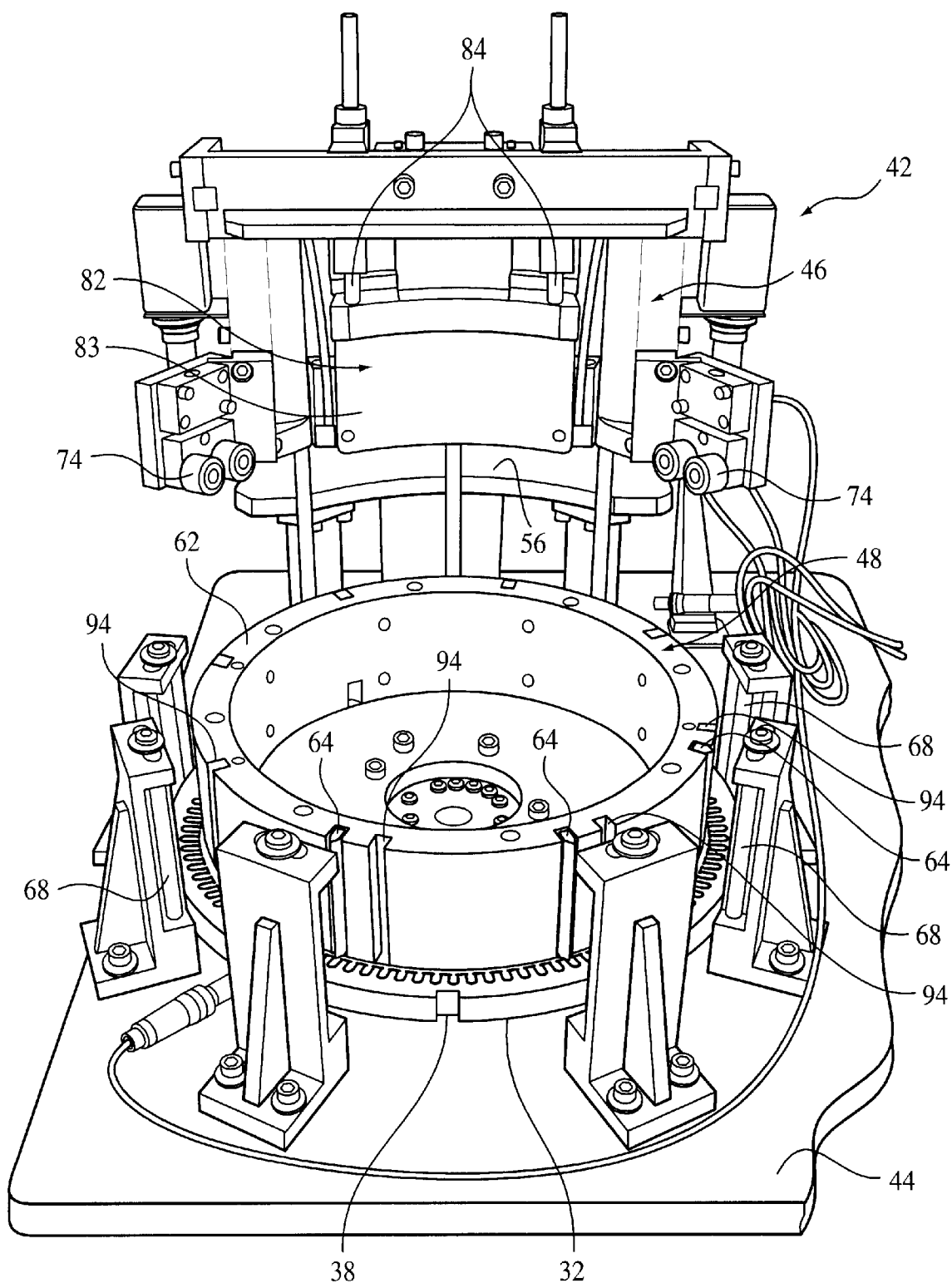
FIG. 7 is a first side view of the stacking machine of FIG. 6.
Figure 8:
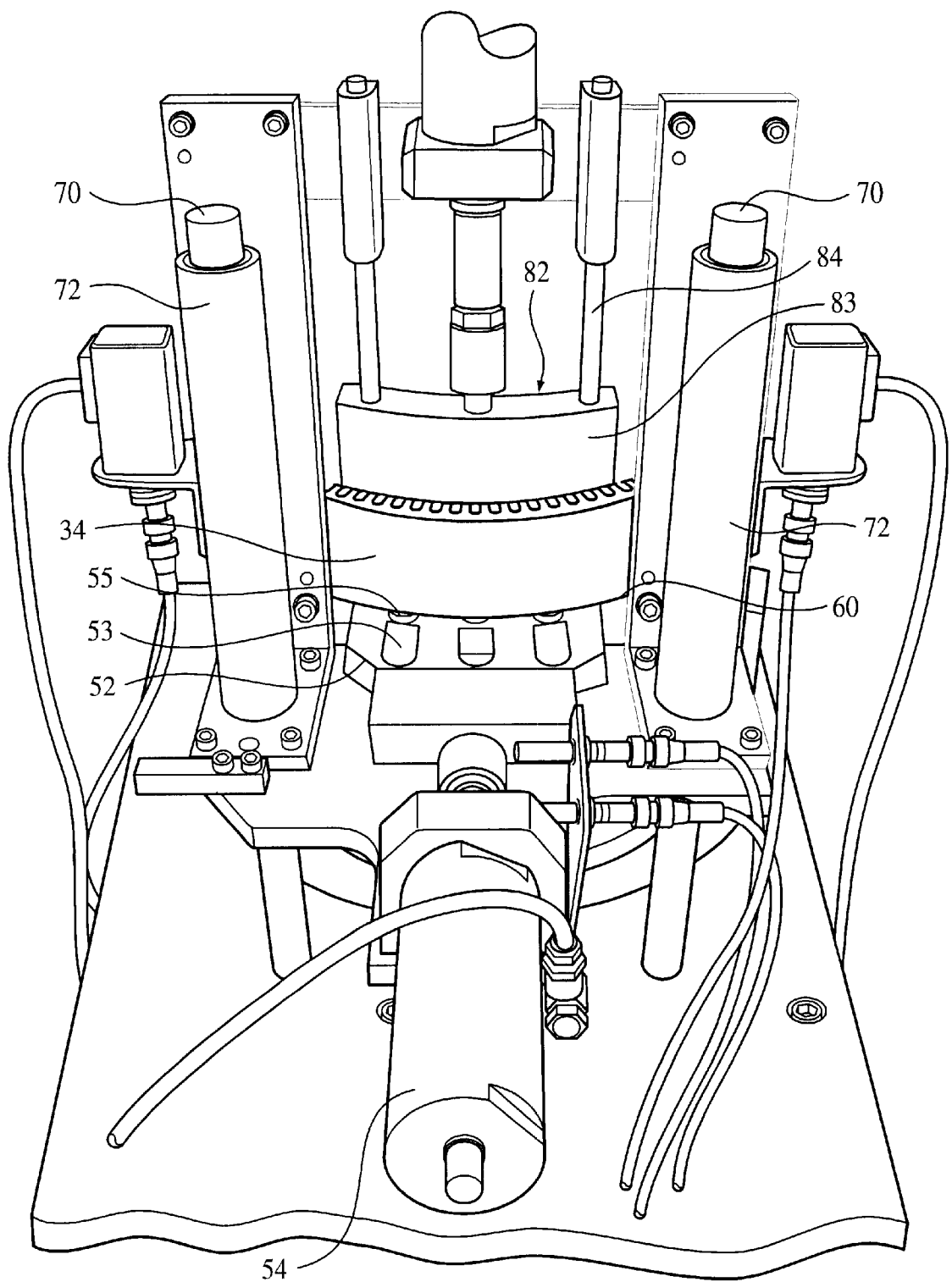
FIG. 8 is a second side view of the stacking machine of FIG. 6.
Figure 9:
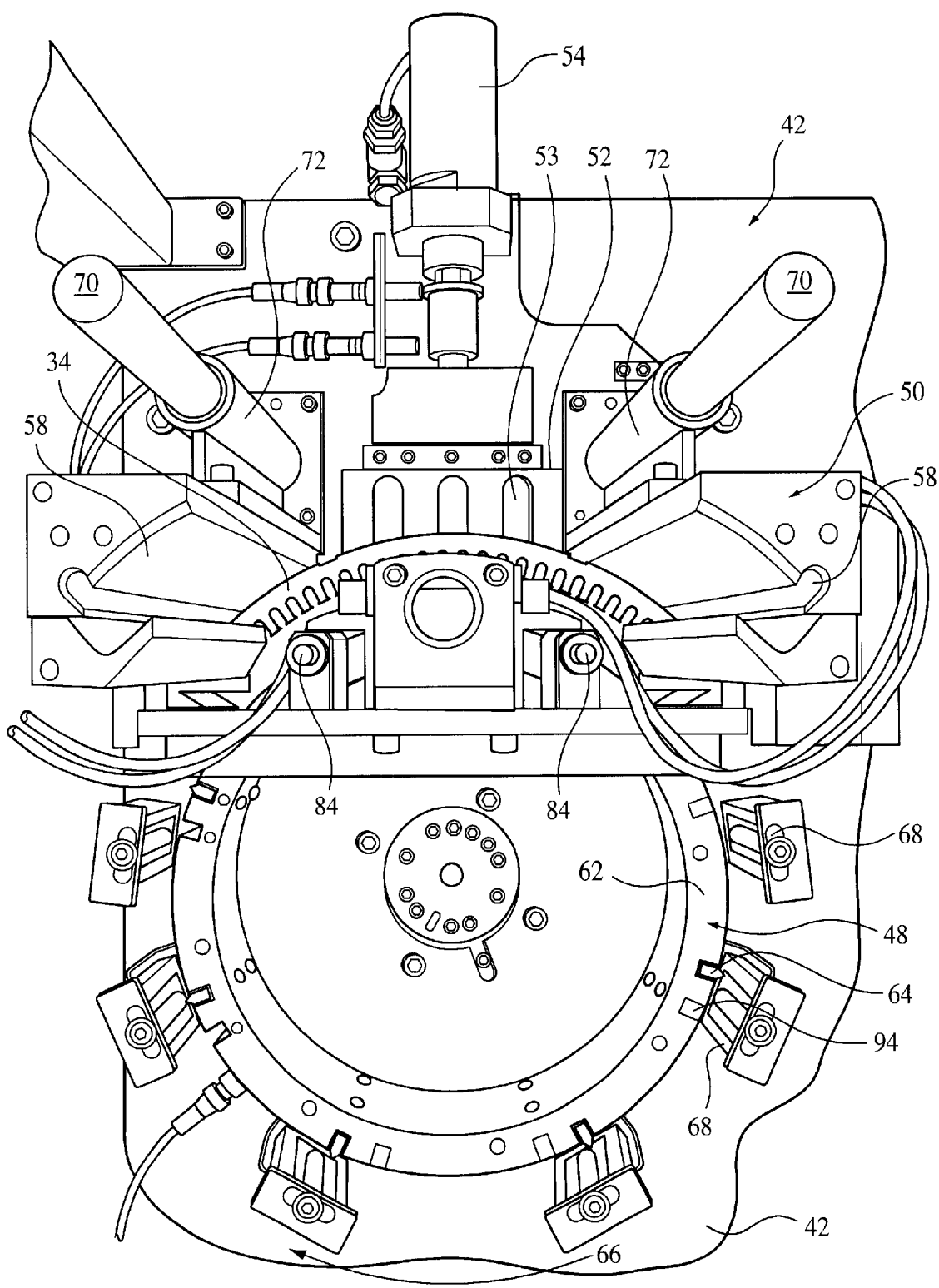
FIG. 9 is a top view of the stacking machine of FIG. 6.

The stripping of segments 34 from magazine 50 can be interfered with by the defects and deflection discussed above. Accordingly in an exemplary embodiment of machine 42, stacking head 46 further includes a segment hold down 82. Hold down 82 mitigates the effect such defects and deflection has on stripping segments 34 from magazine 50. An exemplary embodiment of hold down 82 is illustrated in FIGS. 7 and 8, hold down 82 is includes a block 83 slidably mounted to shafts 84 through bores 85. Shafts 84 are connected to stacking head 46 at their upper ends. Thus, the weight of block 83 rests on segments 34 on dial 48 between cam rollers 74 and acts to compress the deflection and/or defects of layers 30 in dial 48.

Figure 10:
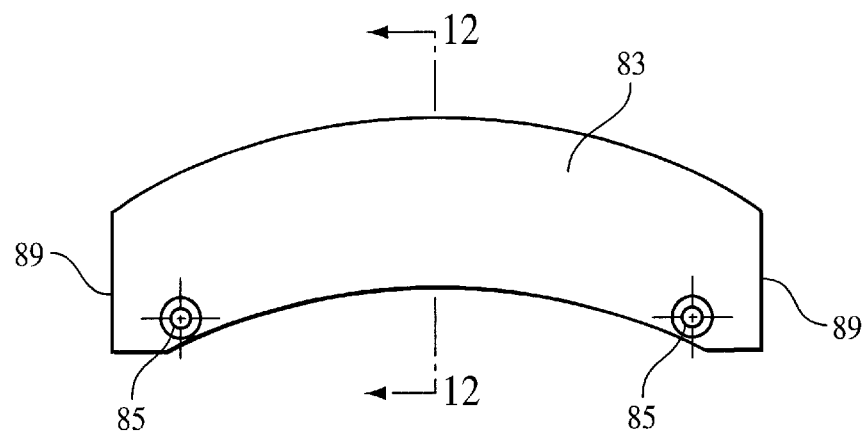
FIG. 10 is a top view of an exemplary embodiment of a segment hold down block.
Figures 11, 12:
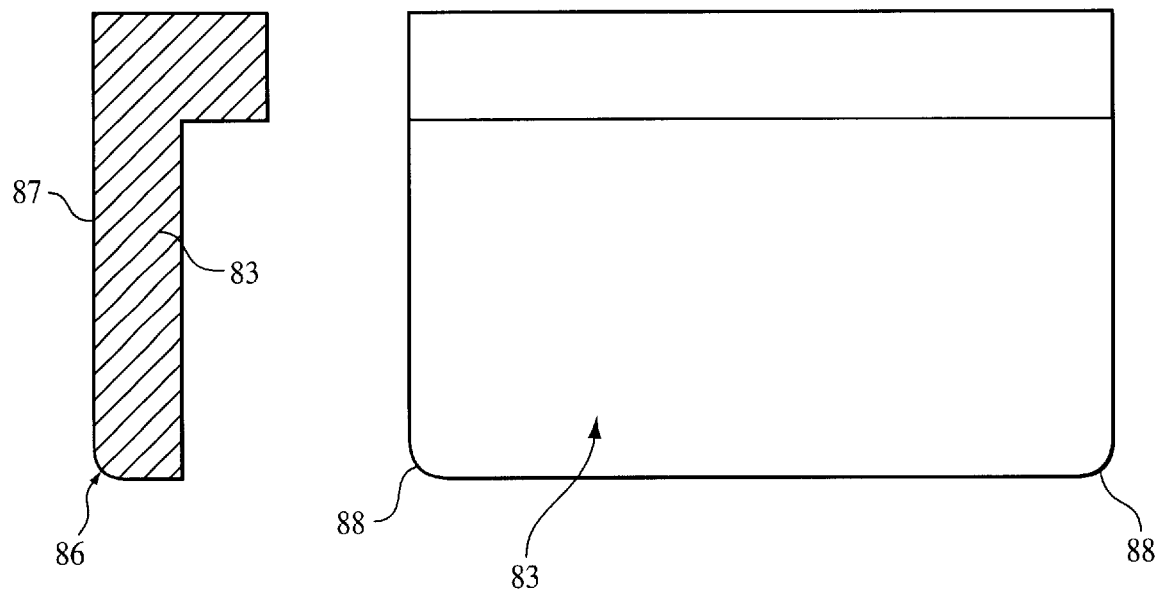
FIG. 11 is a front view of the segment hold down block of FIG. 10.
FIG. 12 is a sectional view of the segment hold down block of FIG. 10, taken along lines 12—12.

Block 83, illustrated in FIGS. 10 through 12, includes a radius or relief 86 along back edge 87, namely the edge proximate stripper blade 52. Thus when stripper blade 52 extends segment 34 into dial 48, the segment acts on block 83 at relief 86. The force of segment 34 extending into dial 48 causes block 83 on to slide upwards on shafts 84. Block 83 also includes a radius or relief 88 along side edges 89. Relief 88 is provided to prevent ends of segments 34 in dial 48 from snagging or catching on block 83 when the dial is rotating. Thus, block 83 provides a sufficient amount of force to segments 34 in dial 48 to overcome defects and deflection, if any, but not enough force to prevent stripper blade 52 from indexing the segments into the dial, and not enough force to interfere with the rotation of the dial. In a preferred embodiment, block 83 provides about five pounds of force to segments 34 in dial 48.

Once core 32 has been completed, layers 30 are secured to one another by cleat 40. Cleat 40 is driven into cleat notches 38 prior to the removal of core 32 from arbor 62. Thus, the cooperation of cleat 40 and notches 38 secures layers 30 to form core 32. It should be recognized that core 32 is described by way of example as including cleats 40 and cleat notches 38 holding the core together. However, it is considered within the scope of the present invention for core 32 to be held together by other connecting means such as, but not limited to, a weld, an adhesive, through bolts or the like.

Machine 42 is described herein by way of example as including one stacking head 46. However, it is considered within the scope of the present application for machine 42 to receive multiple stacking heads 46 on table 44. Thus, the throughput of machine 42 (i.e., the speed of manufacturing core 32) is increased by increasing the number of stacking heads 46 on the machine. Moreover, machine 42 is easily adapted to manufacture cores 32 of different sizes, and number of segments 34 by replacing stacking head 46 and dial 48 with another stacking head 46 and dial 48 of a different size.

Machine 42 includes a controller 90 and an operator control panel 92. Controller 90 such as, but not limited to, a programmable logic controller, is programmable to receive operator inputs from operator control panel 92 such as, but not limited to, a touch screen. Thus, an operator controls machine 42 by initiating the machine to manufacture core 32. In the example provided above where machine 42 is adapted to include multiple stacking heads 42, different numbers of layers 30, different size segments 34, and the like, the operator enters such information into controller 90 via panel 92 prior to initiation of the machine. Controller 90 is adapted to receive operator-entered information from panel 92 to manufacture core 32.

In use, an operator loads segments 34 in magazine 50 and uses control panel 92 to initiate machine 42. Machine 42 activates actuator 54 to extend stripper blade 52 to strip one segment 34 from magazine 50. Stripper blade 52 moves segment 34 until winding openings 36 engage blades 64 of arbor 62. Next, actuator 54 retracts stripper blade 52 back into stacking head 46 away from arbor 62. Once stripper blade 52 clears magazine 50, segments 34 in the magazine drop down onto anvil 56. Dial 48 is rotated 90° in the direction of arrow 66. Rotation of dial 48 causes blades 64 of the dial to act on winding openings 36 of segment 34 to rotate the segment. The rotating segment 34 is maintained in position on dial 48 by the spaced relationship of arbor 62 and rollers 68. The rotation of segment 34 acts on cam rollers 74 of stacking head 46 to slide the stacking head upwards on shafts 70.

The cycle continues three more times to form layer 30, namely actuator 54 extends stripper blade 52 to strip another segment 34 from the magazine, the stripper blade is retracted such that the segments in the magazine drop down onto the anvil, and dial 48 is rotated 90° in the direction of arrow 66. After a placing the fourth segment 34 on dial 48, machine 42 completes a transition cycle. The transition cycle is substantially the same as described above, with the exception that dial 48 is rotated 45° (instead of 90°) to provide a staggered pattern to core 32.

Machine 42 continues in the three 90° rotations and one 45° rotation described above until all six hundred and forty segments 34 in magazine 50 have been indexed into dial 48 to form one hundred and sixty layers 30 of core 32. Once core 32 is completed, securing means such as cleat 40 driven into cleat notches 38 secures layers 30 together. Core 32 is removed from dial 48 by insertion of a tool into openings 94 in dial 48 between the core and the dial.

Accordingly, machine 42 provides for a high speed manufacturing process for assembling core 32 from layers 30 of segments 34. Segments 34 provide excellent material usage of the blank the segments are stamped from, without sacrificing manufacturing or assembly speed. Moreover, the modular nature of machine 42 (e.g., ability to use multiple stacking heads and to manufacturing cores of various sizes and numbers of layers) reduces the initial cost of the machine.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for manufacturing a segmented core for an electric machine, comprising:

a support;

a stacking head mounted on said support and having a magazine, a stripper blade proximate to the bottom of said magazine and a stripper blade actuator, said magazine being sized, dimensioned and positioned to receive a plurality of segments stacked one on top of the other in said magazine, said segments being stamped from a coated electric steel and each having an annular length and winding openings;

a dial operatively associated with said stacking head having an arbor and means for rotating said dial, said arbor having an outer diameter approximately equal to an inner diameter of said segmented core and having radially extending blades being sized, positioned and dimensioned to be engageable with said winding openings;

a support table supporting said stacking head and said dial, said support table having rollers disposed about said arbor at an outer diameter of said segmented core; and means operatively associated with said stripper blade for controlling said stripper blade actuator and said rotating means, said stripper blade actuator being controllable to extend said stripper blade into one of said plurality of segments at a bottom of said magazine to strip said segment from said magazine into said arbor such that said winding openings engage said blades and being controllable to retract said stripper blade, said rotating means being controllable to rotate said dial a first predetermined angular distance and a second predetermined angular distance, said first predetermined angular distance being equal to said annular length and said second predetermined angular distance being equal to half of said annular length, said controlling means being programmable to form a plurality of layers from said plurality of segments by rotating said dial said first predetermined angular distance, extending said stripper blade, and retracting said stripper blade until one of said plurality of layers is complete, and said controlling means being programmable to stagger said plurality of layers by rotating said dial said second predetermined angular distance between each completed layer.

2. The apparatus of claim 1, wherein said rotating means is selected from the group consisting of rotary servo-motors, rotary pneumatic cylinders, and electric motors.

3. The apparatus of claim 1, wherein said support table supports said stacking head on shafts mounted to said support table and riser blocks mounted to said stacking head, said riser blocks being sized, positioned and dimensioned for sliding on said shafts such that said stacking head is vertically slidable with respect to said support table.

4. The apparatus of claim 3, further comprising cam rollers disposed on said stacking head, said cam rollers being sized, positioned, dimension to ride on said segments engaged with said arbor to slide said stacking head on said shafts during formation of said plurality of layers.

5. The apparatus of claim 4, wherein sliding said stacking head ensures said stripper blade is properly positioned with respect to said segmented core.

6. The apparatus of claim 4, further comprising a positioning mechanism connected to said stacking head and said support table, said positioning mechanism compensate for weight of said stacking head to reduces friction between said cam rollers and said plurality of layers.

7. The apparatus of claim 6, wherein said positioning mechanism is an air spring.

8. The apparatus of claim 6, wherein said positioning mechanism comprises a pneumatic cylinder providing a lifting force to a shaft connected to said stacking head.

9. The apparatus of claim 1, further comprising at least two of said stacking heads mounted on same rotary dial and controllable by said controlling means to increase the rate by which said segmented core is made.

10. The apparatus of claim 1, wherein said stacking head, said arbor and said rollers are replaceable by a new stacking head, arbor and rollers, said new stacking head, arbor and rollers being sized, positioned and dimensions for making said segmented core of a different size.

11. An apparatus for manufacturing a segmented core for an electric machine, comprising:

a support;

a dial operatively associated with said support and being rotatable about a first axis to any one of a plurality of positions;

a means operatively associated with said dial for rotating said dial about said first axis;

means operatively associated with said dial for moving a plurality of segments one at a time from a bottom of a stack of segments towards said dial in a direction orthogonal to said first axis; and means for controlling said moving means and said rotating means, wherein said dial is rotated by said rotating means after said moving means moves a segment of said plurality of segments onto said dial until a predetermined number of segments are positioned on said dial.

12. The apparatus as in claim 11, wherein each of said plurality of segments are configured to provide 90 degrees of a circular layer of the segmented core.

13. The apparatus as in claim 11, wherein said rotating means is an electric motor.

14. The apparatus as in claim 11, wherein said moving means comprises a stacking head having a magazine, a stripper blade and a stripper blade actuator, said magazine being configured to receive said stack of segments, said stripper blade proximate to the bottom of said magazine being configured to contact segments at said bottom of said stack, and said stripper blade actuator operatively associated with said stripper blade and being configured to being configured to move said stripper blade to cause said stripper blade to move the segment positioned at said bottom of said stack of segments towards said dial.

15. The apparatus as in claim 14, further comprising a positioning mechanism connected to said stacking head, said positioning mechanism being configured to position said bottom of said stack at a desired position with respect to said dial.

16. The apparatus as in claim 15, wherein said positioning mechanism is an air spring or a pneumatic cylinder.

* * * * *